(No Model.)

I. R. JOSLIN & G. T. LAWRENCE.
WOOD WORKING TOOL.

No. 404,489. Patented June 4, 1889.

WITNESSES
G. Leverich
B. G. Lingeman

INVENTORS
I. R. Joslin
G. T. Lawrence
By Geo. R. Ferguson
ATTORNEY.

UNITED STATES PATENT OFFICE.

ISAAC R. JOSLIN AND GEORGE T. LAWRENCE, OF NEW YORK, N. Y.

WOOD-WORKING TOOL.

SPECIFICATION forming part of Letters Patent No. 404,489, dated June 4, 1889.

Application filed November 20, 1888. Serial No. 291,367. (No model.)

*To all whom it may concern:*

Be it known that we, ISAAC R. JOSLIN and GEORGE T. LAWRENCE, citizens of the United States, residing at New York, in the county of New York, State of New York, have invented a new and useful Improvement in Wood-Working Tools, of which the following is a specification.

Our invention relates to the improvement of the cutters employed in working grooves, dados, gains, or crozes, or, in combination with other cutters, for plowing, rabbeting, forming and dividing tongues, raising panels, opening casings and stair-stringers, flat or surface cuts made from the edge, the tool reaching over, or any other wood-work in which a straight cut of any form of outline is produced in or on wood by means of revolving or reciprocating tools; and the object of our invention is to form the cutters in such a manner that overheating and burning of the cutting-edge may be prevented; second, to form the cutter in such a manner that with the same size of tool as in the old forms a much deeper cut can be made. We attain these objects by mechanism illustrated in the accompanying drawings, in which—

Figure 1:
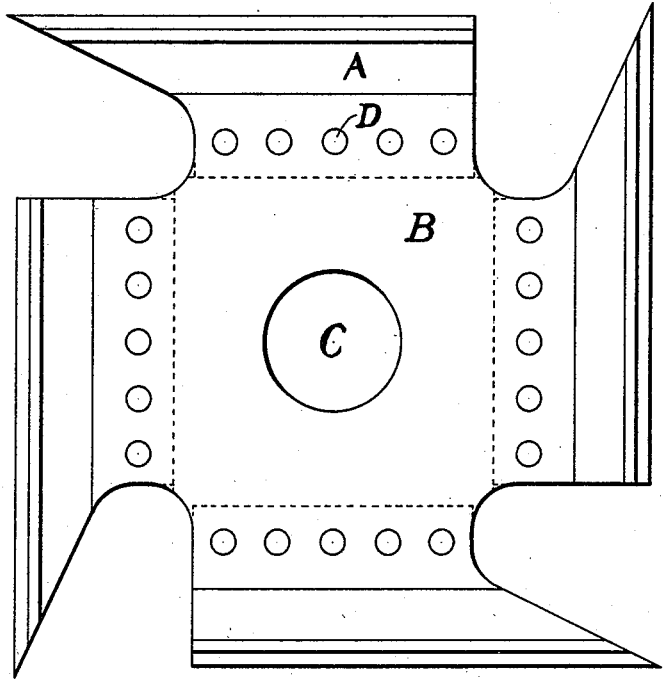
Figure 2:
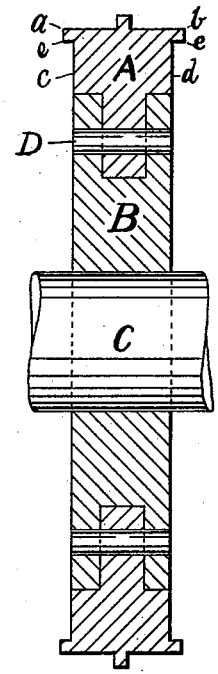
Figure 3:
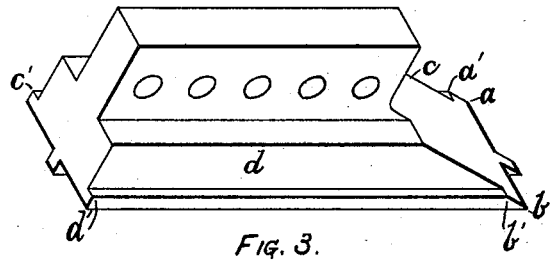
Figure 4:
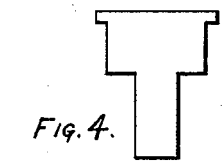
Figure 6:
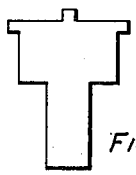
Figure 5:
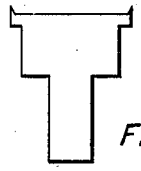
Figure 7:
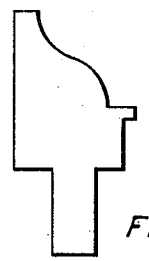

Figure 1 is an elevation, and Fig. 2 a central section, of a cutter and tool-stock embodying our improvements. Fig. 3 is a perspective view of the bit or cutter. Fig. 4 is an end elevation of a cutter used for plowing. Fig. 5 is an end elevation of a cutter used for making dados. Fig. 6 is an end elevation of a cutter for making matches, and Fig. 7 is an end elevation of a cutter for making a molding or raised panel.

The form of the cutting-edge varies with the nature of the work; but the essential element of our improvement may be applied to all of them with like effectiveness.

As shown in Figs. 1 and 2, the cutter or tool A is secured to the head B by bolts or rivets D. A mandrel C is secured to the head and is turned by power. In this form of tool it has been the practice to make the cutting-edge $a\,b$ and body $c\,d$ of the cutter of the same uniform width, and the consequence is that on forming a cut the sides $a\,c$ and $b\,d$ would rub on the sides of the cut and rapidly heat the cutting-edge by friction, so that the edge lost its temper or burned away. This fact also prevents the tool from making a deep cut, the deeper the cut the greater being the friction.

In our improved cutter we mill, plane, swage, or otherwise reduce the thickness of the tool below the cutting-edge by a square or nearly square corner $e$, as shown in Figs. 1, 2, and 3, $a\,b$ being the cutting-edge. Immediately behind it the cutter is reduced to the width $c\,d$. When these clearance reductions are made in the body of the cutter, the depth of the cut can be made up to the mandrel without heating or binding.

By making the corners $e$ substantially square the edges $a'\,c'$ and $b'\,d'$ are constituted cutting-edges or side tools, and the cutter clears itself with a smooth-cut shaving instead of by the objectionable grinding or scraping action of the cutters heretofore in use, which rapidly become overheated and clogged.

As shown in the several figures, whether the cutter be used for a surface cut or for a cut from the edge of the wood, in each instance the cutter is provided, besides the usual surface-cutting edge, with a narrow side-cutting edge, which co-operates with this to do the work of forming the cut, and at the same time affords a clearance-space for the escape of the shaving through the reduced width of the cutter-body.

It is essential that the corner $e$ should be substantially a right angle or square jog, as described above and shown in the several figures, for should it be rounded or obtuse no cutting action could be performed by $a'\,c'\,b'\,d'$.

Having thus fully described the nature of our invention, what we believe to be new, and desire to secure by Letters Patent, is—

1. A cutter provided with a cutting-edge $a\,b$, similar in outline to the surface to be produced, in combination with a narrow supplemental side-cutting edge $a'\,c'$, formed by a substantially square jog extending to a cutter-body reduced in width immediately in rear of the said two cutting-edges, substantially as described.

2. In combination with a cutter-body, a surface-cutting edge $a\ b$ thereon with lateral cutting-edges $a'\ c'$ and $b'\ d'$ on the sides thereof, said body being reduced in width immediately back of said cutting-edges with a square jog, substantially as set forth.

ISAAC R. JOSLIN.
    GEORGE T. LAWRENCE.

Witnesses:
 JOHN J. CANAVAN,
 CHAS. S. BARTLETT.